United States Patent [19]

Kiyonaga

[11] Patent Number: 5,070,419

[45] Date of Patent: Dec. 3, 1991

[54] METHOD AND APPARATUS FOR RECORDING AND REPRODUCING OF A RECORDING MEDIUM

[75] Inventor: Chitoku Kiyonaga, Higashi-Hiroshima, Japan

[73] Assignee: Sharp Kabushiki Kaisha, Osaka, Japan

[21] Appl. No.: 417,200

[22] Filed: Oct. 4, 1989

[30] Foreign Application Priority Data

Oct. 7, 1988 [JP] Japan .............................. 63-254383

[51] Int. Cl.[5] .............................................. G11B 15/18
[52] U.S. Cl. .................................. 360/72.2; 360/10.3
[58] Field of Search .................... 360/72.2, 72.1, 74.1, 360/33.1, 10.3, 36.2

[56] References Cited

U.S. PATENT DOCUMENTS

| | | | |
|---|---|---|---|
| 4,280,147 | 7/1981 | Baldwin | 360/10.3 |
| 4,389,678 | 6/1983 | Mizukami et al. | 360/10.3 |
| 4,591,931 | 5/1986 | Baumeister | 360/72.1 |
| 4,616,337 | 10/1986 | Sheth | 364/900 |
| 4,807,060 | 2/1989 | Takahashi et al. | 360/72.2 |
| 4,821,128 | 4/1989 | Inazawa et al. | 360/72.2 |

FOREIGN PATENT DOCUMENTS 2130988 6/1971 Fed. Rep. of Germany .

OTHER PUBLICATIONS

"Microprocessors/Microcomputers" by Givone et al., p. 270, McGraw-Hill, Inc., 1980.

IBM Technical Disclosure Bulletin; C. L. Ridings; "Reading Rate Control", vol. 8, No. 8, Jan. 1966, p. 1047.

*Primary Examiner*—John H. Wolff

[57] ABSTRACT

When recording digital data on a recording medium, digital data is divided into information units of digital data which are further divided into recording units to be recorded on the recording medium. The digital data is recorded in the recording medium together with identification information to specify the information unit of the recording unit. When reproducing, the digital data which has been reproduced from the recording medium is temporarily stored in a memory unit whose capacity is more than one information unit. After the stored digital data reaches a capacity of at least one information unit or more, the digital data is outputted from the memory unit in the information unit format. Furthermore, when the reproducing operatoin is discontinued, a controller stored the identification information of the recording unit to be reproduced next, and the digital data of the recording unit to be recorded next is subsequently reproduced on the basis of the identification information when re-starting the reproduction and is stored in the memory unit, thereby causing the reproducing operation to become more reliable.

7 Claims, 6 Drawing Sheets

MOTOR
DRIVER
RECORDING SIGNAL PROCESSOR
CONTROLLER
AMPLIFIER
CHANGEOVER SWITCH
SIGNAL EQUIVALENT PROCESSOR
REPRODUCING SIGNAL PROCESSOR
BUFFER MEMORY
EXTERNAL EQUIPMENT
33
32
31
30
29
28
27
26
25
24
23
2(2a,2b)
1

METHOD AND APPARATUS FOR RECORDING AND REPRODUCING OF A RECORDING MEDIUM

BACKGROUND OF THE PRESENT INVENTION

1. Field of the Present Invention

The present invention relates to a method and apparatus for recording onto and reproducing from a recording medium which is preferably realized by a digital data recording and reproducing apparatus in which a rotary head such as a DAT (digital audio tape recorder) is used.

2. Description of the Prior Art

In a magnetic tape recording and reproducing apparatus of a helical scanning system provided with a rotary head which is in the typically conventional art, two magnetic heads are mounted in the opposite direction to each other by 180°, at the side of a cylindrical rotary drum. A magnetic tape is wound, as to be inclined by an angle $\theta 1$ to the vertical plane of an axis line of a rotary drum, to the side of this rotary drum for instance with a wrap angle of 90°. The gap between the above two magnetic heads has an azimuth angle of (angle $+\alpha$) and another azimuth angle (angle $-\alpha$) for the rotary axis line, respectively. Thereby cross talk can be prevented when reproducing using these two magnetic heads. Therefore, a so-called guard track is not needed between tracks formed by these two magnetic heads, and high density recording can be accomplished.

FIG. 1 is a view showing the track pattern of a magnetic tape 41 on which digital data has been recorded by an apparatus like the above-mentioned. When recording and reproducing, the magnetic tape 41 travels in the direction shown with an arrow 2 at the traveling speed Vt and the rotary drum rotates at the rotation speed Vd, thereby causing the magnetic heads of the rotary drum to scan the magnetic tape 41 obliquely. As the traveling speed Vt is sufficiently slowed to the rotary speed Vd, the inclination $\theta 2$ of the track on the magnetic tape 41 is roughly equivalent to the angle $\theta 1$ above-mentioned.

On the magnetic tape 41, a track Ai (i=0 to n) is, for example, the magnetic head whose azimuth angle is $+\alpha$, and the track Bi is for another magnetic head whose azimuth angle is $-\alpha$, and digital data is recorded on these tracks, respectively. One pair of tracks, Ai and Bi, constitutes a frame Fi and digital data is recorded and reproduced with this frame Fi used as unit. When reproducing digital data, the traveling speed Vt of the magnetic tape 41 is controlled so that the two magnetic heads can scan on the tracks Ai and Bi individually corresponding thereto When a recording and reproducing apparatus is used as auxiliary memory unit, for instance, of a computer, digital data is recorded on each of the tracks Ai and Bi. Each of these tracks, Ai and Bi, is separated into, for example, a main data area and an auxiliary data area shown with oblique lines in FIG. 1. The digital data is recorded in the main data area, and information pertaining to the details of recording in the main data area is recorded in the auxiliary data area. For example, block numbers described in detail later are recorded in the auxiliary data area of the tracks Ai and Bi. That is, [p−1] and [p] attached to the tracks Ai and Bi in FIG. 1 express the block numbers recorded in the auxiliary data area of the track.

In a computer or like devices, usually digital data is inputted and outputted, using a block format as the unit of information. The volume of information of this block is variable.

When the data volume of one block exceeds the data capacity of a frame in the above-mentioned magnetic tape recording/reproducing apparatus, the digital data of the block is separated into a plurality of frames and can be recorded.

At this time, a block number to distinguish which block of digital data is to be recorded in the main data area and the tracks are recorded in the auxiliary data area. When reproducing, the required digital data is reproduced block by block on the basis of this block number.

When the digital data is inputted into and outputted from external equipment of a computer, etc. on a block-by-block basis, the inputting and outputting operations are asynchronous with the recording and reproducing operation for which the frame Fi is the unit of the recording and reproducing apparatus. For this reason, the recording and reproducing apparatus is provided with buffer memory, thereby causing the input and output with relation to the external equipment to be accomplished by using this buffer memory. Therefore, a buffer memory having more memory capacity than the recording capacity of a block is used.

As illustrated in FIG. 1, the digital data of a plurality of blocks is reproduced one after another in the order of block numbers. When the digital data of the block p is about to be reproduced, the two magnetic heads read out digital data from the tracks A2 and B2 one after another. Thus, when the capacity of the buffer memory becomes full when digital data of the tracks Ak and Bk of the frame Fk, for instance, is stored in the buffer memory, the magnetic tape stops, and the block of digital data stored before the block number p is outputted block by block from the buffer memory to the external equipment. Thereafter, the magnetic tape 41 is wound back a little before proceeding, thereby causing reading-out of digital data to be started again from the next frame Fk+1 of the block number p and to be stored in the buffer memory.

However, as the traveling of the magnetic tape 41 comes to a stop because the available area runs out in the buffer memory of such a recording/reproducing apparatusis occupied, it is impossible well to trace the magnetic heads to the required track Ak+1, for instance, for the frame Fk+1 when re-starting the magnetic tape 41, thereby causing correct read-out movement not to be conducted. In these cases, as only the block number is written in each frame, it is impossible for the recording/reproducing apparatus to judge whether or not digital data is read out from the frame Fk+1 next. There is a possibility of reproducing and outputting digital data which is different from that to be read out at this time. Therefore, such a recording and reproducing apparatus has little reliability.

SUMMARY OF THE PRESENT INVENTION

It is an object of the present invention to provide a method and apparatus for recording and reproducing of a recording medium, which can solve the above technical problems and whose reliability has been much improved.

The present invention uses a reproducing method for a recording medium in which information is recorded in a plurality of information units by a predetermined recording unit together with an identification information to specify a recording area comprising the steps of:

storing information reproduced from the recording medium by the recording unit sequentially in a memory whose recording capacity is more than one information unit;

when reproducing operation is discontinued, storing an identification information of the recording unit to be reproduced next;

when the reproducing operation is re-started, restarting the reproduction from the information of the recording unit to be reproduced next on the basis of the identification information and storing the information in the memory unit; and outputting information from the information unit after information of at least one information unit has been stored in the memory means.

The present invention utilized a method for recording digital data in a recording medium and for reproducing digital data from the recording medium comprising the steps of:

receiving digital data in an information unit format of variable information amount from external equipment;

When the information unit exceeds a recording unit, separating digital data according to the information unit and recording the data in the recording unit on the recording medium together with discrimination information;

when reproducing, storing the digital data reproduced from the recording medium sequentially in a memory unit whose memory capacity is more than a memory capacity of one information unit;

when the reproducing operation is discontinued, storing the discrimination information to indicate the recording unit to be reproduced next, when re-starting the reproducing operation, searching for the digital data of the recording unit to be reproduced next on the basis of the discrimination information and storing the digital data in the memory unit, and after the digital data of at least one information unit is stored in the memory means, outputting the digital data to an external equipment by the information unit.

The present invention is directed to an apparatus for reproducing a recording medium comprising;

a recording medium in which information divided into one or more information units is recorded using a recording unit format together with an identification information to specify a recording area, an unit for reproducing the information using the recording unit format from the recording medium, memory unit having a memory capacity is more than information unit, for storing information reproduced from the reproducing unit, and a control unit for controlling, when a reproducing operation is discontinued, an identification information of the recording unit to be reproduced next to be recorded, and, when re-starting the reproducing operation, for starting the reproducing operation, for information to be reproduced next on the basis of the stored identification information and the reproduced information can be stored in the memory unit, and after information of at least one information unit has been stored in the memory unit the information can be outputted by information unit.

The present invention is directed to an apparatus for recording and reproducing using of a recording medium comprising:

a recording medium having recording area in which digital data is recorded using a predetermined recording unit, means for generating data signals to input and output digital data of an information unit of variable information amount, means for separating the digital data of the information unit when the information amount from the data signals generating means exceeds the recording unit and for recording the digital data in the recording medium together with discrimination information by the recording unit, memory means whose capacity is more than one information unit, means for reproducing digital data from the recording medium by the recording unit and storing the data in the memory means, and means for controlling wherein discrimination information of the recording unit to be reproduced next can be memorized when reproducing operation is discontinued in response to the output of the reproducing means, reproduction can be re-started in accordance with the discrimination information when re-starting the reproducing operation, the digital data of the recording unit to be reproduced next can be searched for and can be stored in the memory means, and the digital data can be outputted to the data signals generating means by the information unit by means of detecting that the digital data of at least one information unit has been stored in the memory means.

The apparatus for recording and reproducing of a recording medium disclosed by the present invention, wherein;

the recording medium is a magnetic tape, the information is recorded by helical scanning system, and the recording area is one or a plurality of tracks inclined for the lengthwise direction of the magnetic tape.

The apparatus for recording and reproducing of a recording medium disclosed by the present invention further comprises;

means for driving the magnetic tape, first means for detecting that the digital data has been stored up to predetermined memory capacity of the memory means, and second means for detecting that storage area at least equivalent to one recording unit is available in the memory means, wherein the controlling means controls so that the driving of the magnetic tape by the driving means can be caused to stop in response to the output of the first means and the reproducing operation can be re-started after the magnetic tape is wound back by predetermined distance by means of the driving means in response to the output of the second means after the reproducing operation is discontinued.

The apparatus for recording and reproducing of a recording medium disclosed by the present invention, wherein;

the discrimination information is distinct from the information to be recorded and is recorded in repetition in the recording area by recording unit.

According to the present invention, when the information unit exceeds the predetermined recording unit, the digital data of one information unit is divided into recording units and is recorded on the recording medium together with the identification information for each recording unit.

When reproducing, after digital data reproduced from the recording medium is stored sequentially in memory means whose memory capacity is more than one information unit and the digital data of at least one information unit is stored, the digital data is outputted to an external equipment by the information unit.

Thus, as the identification information is recorded in the recording medium, corresponding to the digital data of each recording unit, it is possible accurately to reproduce the digital data of the recording unit to be reproduced next on the basis of the identification information even though the reproducing operation is discontinued.

According to the present invention, as a method and apparatus for recording and reproducing of the recording medium are so composed that the digital data can be recorded in the recording medium with the identification information attached to every recording unit, it is possible smoothly to carry out the reproducing operations from the recording medium on the basis of this identification information without fail. Therefore, in reproducing information from a recording medium, the reliability can be remarkably improved.

BRIEF DESCRIPTION OF THE DRAWINGS

These and other objects, features and advantages of the present invention will become apparent from the ensuring detailed description when read in conjunction with the accompanying drawings.

DESCRIPTION OF THE PREFERRED EMBODIMENT

Figure 1:
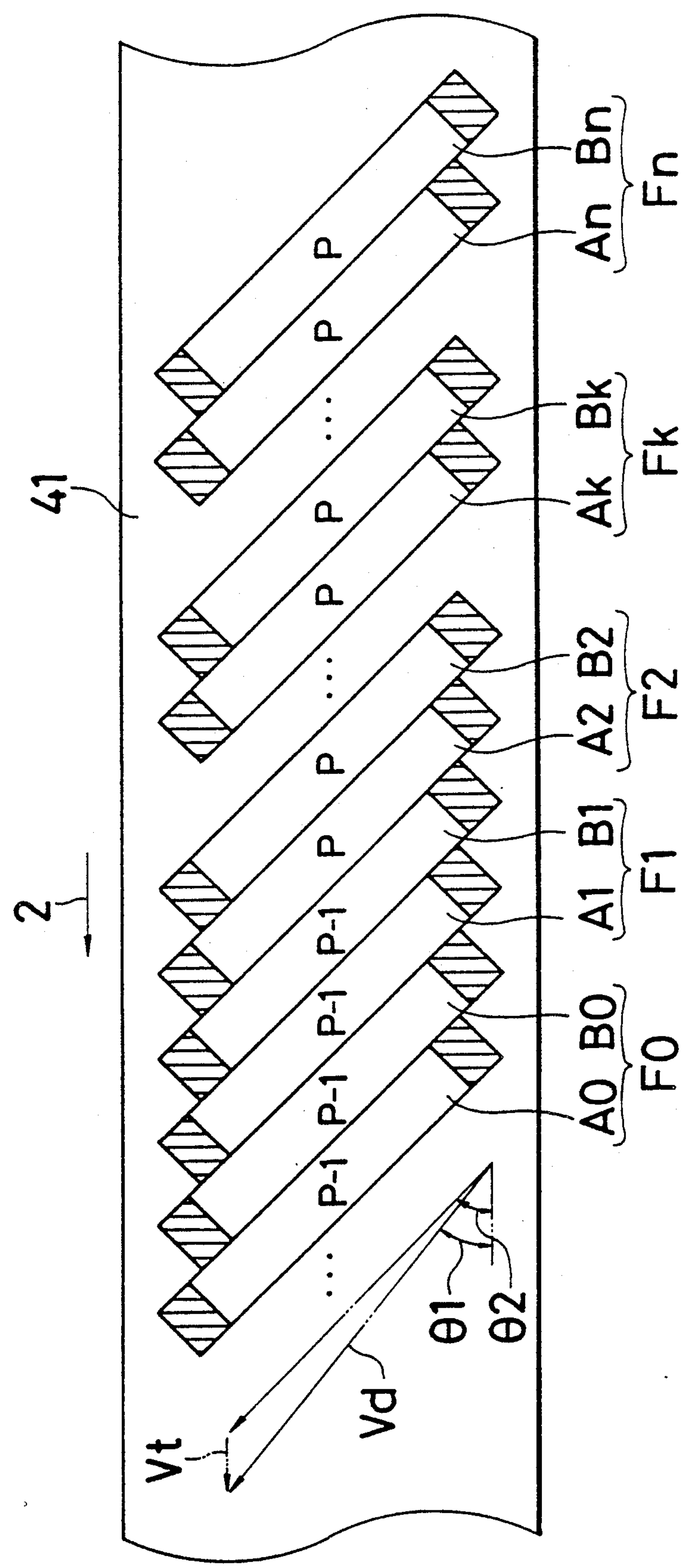
FIG. 1 is a plan view showing the track patterns of magnetic tape 41 on which data is recorded by a conventional magnetic tape recording apparatus.
Figure 2:
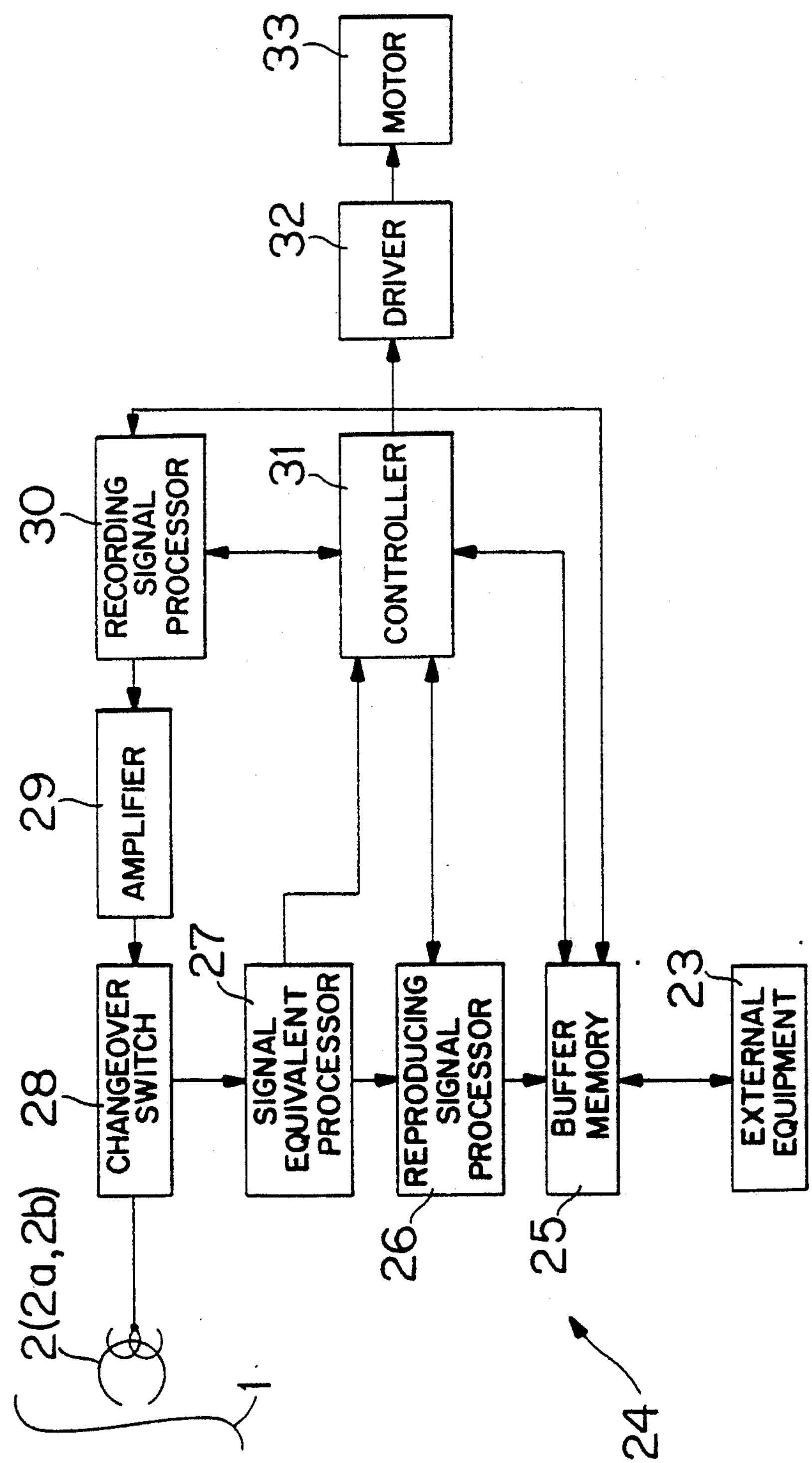
FIG. 2 is a block diagram showing the electrical composition of the recording/reproducing apparatus 24 which is one of preferred embodiments of the present invention.

FIG. 2 is a block diagram showing the electrical composition of the recording/reproducing apparatus 24 which is one of preferred embodiments of the present invention. The recording/reproducing apparatus 24 is composed of magnetic heads 2*a* and 2*b* (generally called "magnetic head 2" hereinafter), a reproducing signal processor 26, a recording signal processor 30, a controller 31, and buffer memory 25, and is used as an auxiliary memory unit of an external equipment 23, for example, of a computer.

The recording/reproducing apparatus 24 records the digital data in a block format which is the information unit having variable information capacity from an external equipment 23, on a magnetic tape 1 in a frame which is the predetermined recording unit, reproduces the digital data from the magnetic tape 1 and outputs the data block by block.

The digital data in the block format from the external equipment 23 is temporarily stored in buffer memory 25. The digital data in the buffer memory 25 is outputted frame by frame by the recording signal processor 30. Auxiliary data which comes from the controller 31 is received by the recording signal processor 30. Furthermore, synchronous signals are superimposed, thereby causing the recording signals to be produced. This auxiliary data includes, for example block numbers to discriminate respective blocks and frame numbers determined by adding up a plurality of frames in each block. The output from the recording signal processor 30 is amplified by an amplifier 29 and is outputted to the changeover switch 28.

The changeover switch 28 outputs signals from the amplifier 29 to the magnetic head 2 when recording. The magnetic head 2 writes the digital data on the magnetic tape 1 in the manner described below.

In the reproducing operation of the recording/ reproducing apparatus 24, the digital data written on the magnetic tape 1 is read out by the magnetic head 2. The output of the magnetic head 2 is received by to the changeover switch 28. The changeover switch 28 leads the output from the magnetic head 2 to the signal equivalent processor 27.

The signal equivalent processor 27 can divide the digital data from the magnetic head 2 into main data and auxiliary data, which are described in detailed later, and can output the main data to the reproducing signal processor 26 and the auxiliary data to the controller 31.

The reproducing signal processor 26 stores frame-by-frame digital data, in which various kinds of signal processing is carried out on to the main data, in the buffer memory 25 one after another.

The controller 31 detects, on the basis of the auxiliary data that the digital data of one block has been stored in the buffer memory 25, and can output the digital data in the buffer memory 25 to an external equipment 23 by the unit of block.

For instance, when the digital data is stored up to full capacity of the buffer memory 25, the controller 31 outputs a stop signal to the driver 32, thereby causing the drive of motor 33 to stop the operations of the magnetic tape 1. At this time, the controller 31 stores the block number and the frame number of a frame to be stored next in the buffer memory 25 on the basis of the auxiliary data. Thereafter, the digital data of one block is outputted from the buffer memory 25. As empty area is produced in the buffer memory 25, the controller 31 starts the reproducing operation of the magnetic tape 1 again.

Figure 3:
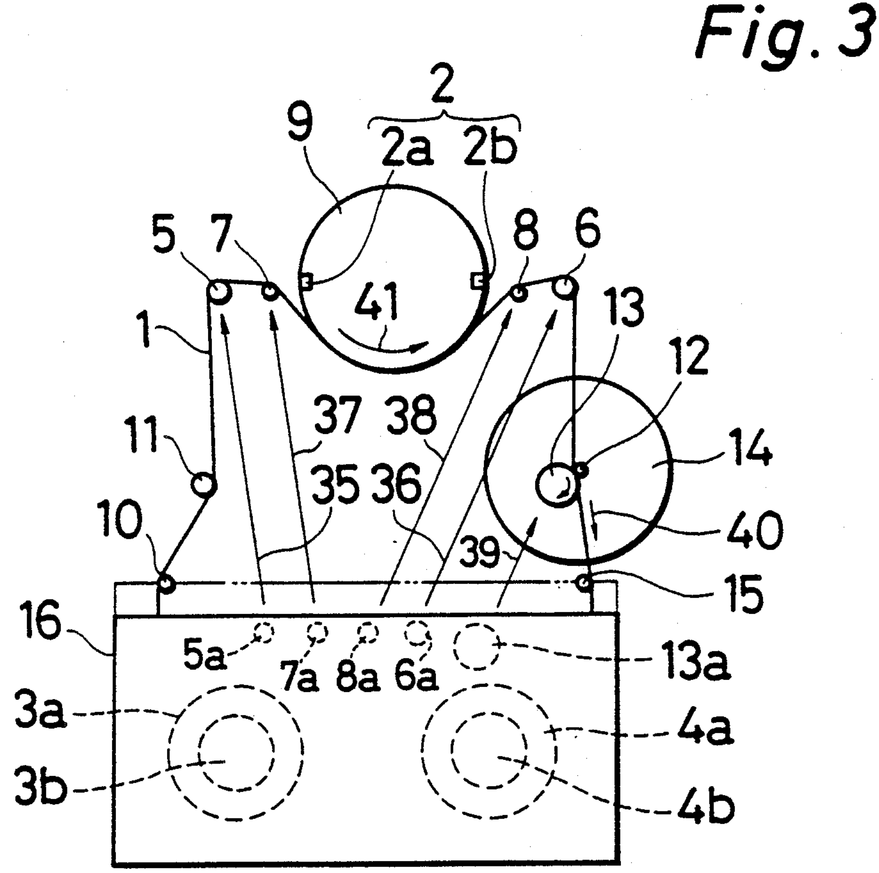
FIG. 3 is a plan view showing the construction in the vicinity of the rotary drum 9 of the recording/reproducing apparatus 24.

FIG. 3 is a plan view showing the composition in the vicinity of the rotary drum 9 of the recording/reproducing apparatus 24. The magnetic tape 1 is housed in a cassette 16, and both the ends of this magnetic tape 1 are wound on a pair of reels (not shown) of the cassette 16. The pair of reels of the cassette 16 are respectively mounted at a pair of a feeder side reel base 3*b* and a winding side reel base 4*b*, which are driven by a feeder reel motor 3*a* and a winding reel motor 4*a*, respectively.

Figure 4:
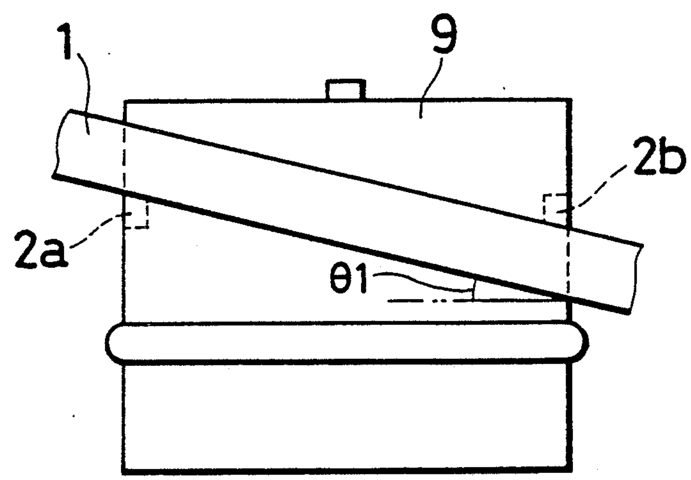
FIG. 4 is a side view of the rotary drum 9.

As this cassette 16 is mounted in the recording/ reproducing apparatus 24, guide rollers 5 and 6 and inclination posts 7 and 8 move from the positions 5*a*, 6*a*, 7*a* and 8*a* shown with broken lines to the position shown with solid lines in the direction of an arrow 35 to 38, thereby causing the magnetic tape 1 to be led out from the cassette 16. The magnetic tape 1, as shown in FIG. 4, is wound on the rotary drum 9 with a required angle 81, for instance, with the wrap angle of 90° (degrees), by means of the inclination posts 7 and 8.

This magnetic tape 1 is wound to the tension post 11 with a fixed angle regardless of fluctuation of the winding length, by means of the feeder side fixed post 10, and the tension given to the rotary drum 9 can be kept constant by this tension post 11. At the side of the cylindrical rotary drum 9, a magnetic head 2a having a gap of an azimuth angle of, for example, $+\alpha$ and another magnetic head 2b having a gap of an azimuth angle of, for example, $-\alpha$ are mounted in the opposite direction to each other by 180° (degrees).

Also, as a pinch roller 13 moves from the position shown with a broken line 13a as shown by an arrow 39 and is brought into press with a capstan 12 via the magnetic tape 1. This capstan 12 is driven by a capstan motor 14 and causes the magnetic tape 1 to travel at a required speed.

The magnetic tape 1 is wound on a reel which is mounted at the winding reel base 4b by way of the winding side fixed post 15.

In such a composition as shown in FIG. 3, the magnetic tape 1 travels at the traveling speed Vt shown with an arrow 40 on recording data, and the rotary drum 9 rotates at a constant rotation speed Vd as shown with an arrow 41. Thereby the magnetic heads 2a and 2b can scan the magnetic tape I obliquely alternately and tracks Ai and Bi ($i=0$ to n) shown in FIG. 5 are formed.

Figure 5:
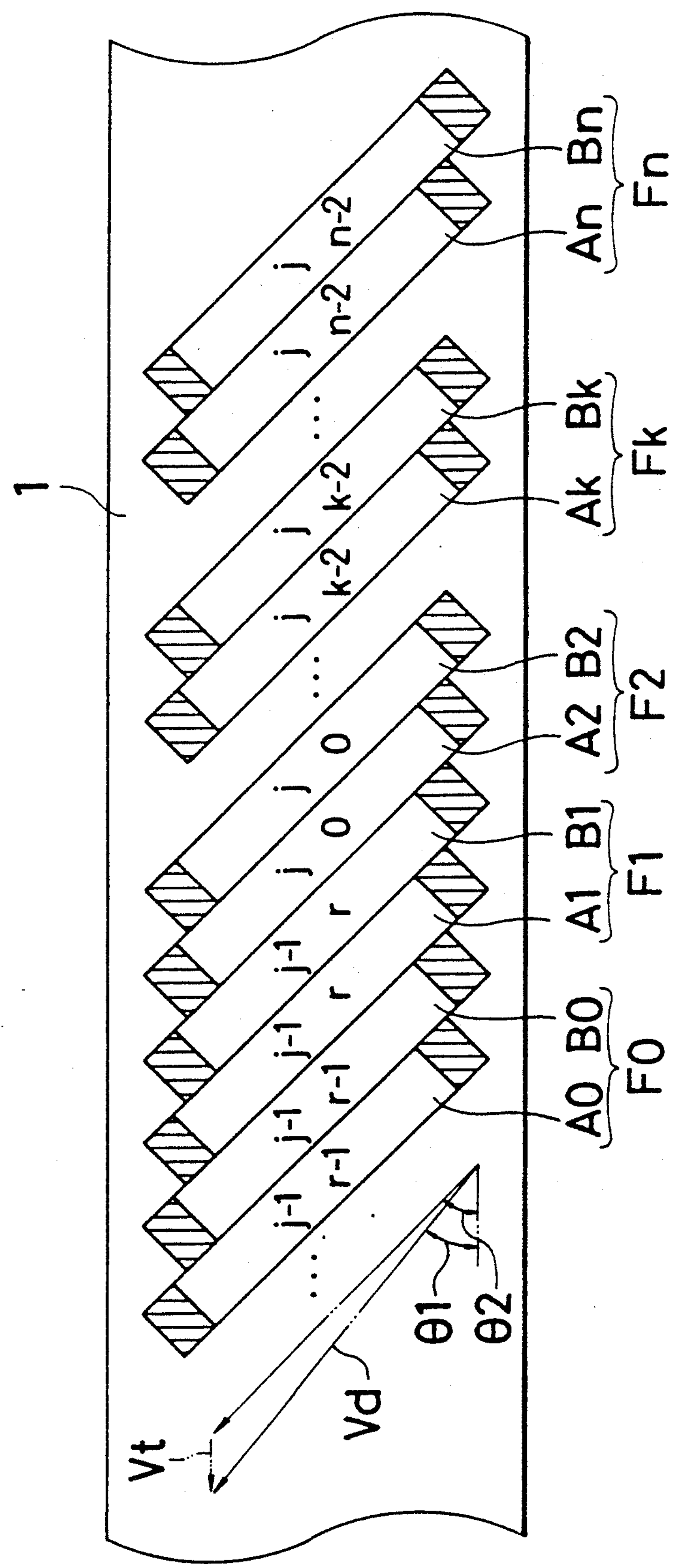
FIG. 5 is a plan view showing the track pattern of the magnetic tape 1.

With reference to FIG. 5, as the traveling speed Vt of the magnetic tape 1 is sufficiently slow in comparison with the rotation speed Vd of the rotary drum 9, the inclination $\theta 2$ of the tracks Ai and Bi on the magnetic tape 1 becomes roughly equivalent to the angle $\theta 1$ in winding the above mentioned magnetic tape 1.

The track Ai on the magnetic tape 1 is formed by writing the digital data by means of the magnetic head 2a and another track Bi is formed by another magnetic head 2b. The magnetic heads 2a and 2b record the digital data on the magnetic tape 1 alternately, thereby causing a pair of the tracks Ai and Bi formed on the magnetic tape 1 to form one frame Fi which is the unit of recording. The digital data is recorded on these tracks Ai and Bi, and these tracks Ai and Bi are divided into a main data area and an auxiliary data area shown with oblique lines in FIG. 5, respectively. The digital data from the above mentioned external equipment 23 are written in this main data area, and such auxiliary data as the above mentioned frame number and block number are written in the auxiliary data area.

On reproducing data, the traveling speed Vt of the magnetic tape 1 is so controlled that the magnetic heads 2a and 2b can scan the tracks Ai and Bi corresponding thereto respectively.

In FIG. 5, [j−1] and [j] attached to each track express the block number of a block to which the digital data of the track belongs, and [r−1], [r] [0] to [n−2] express the frame number. As for data written in the auxiliary data area, the same data are written several times so that it can be correctly reproduced even in reproducing with the magnetic tape 1 traveled at a faster speed by several times to several decades of times than the usual speed in the normal direction or the reverse direction, that is, in a high speed searching. Namely, for instance, the same auxiliary data are written eight times in the auxiliary data area at both the ends of each track.

Figure 6:
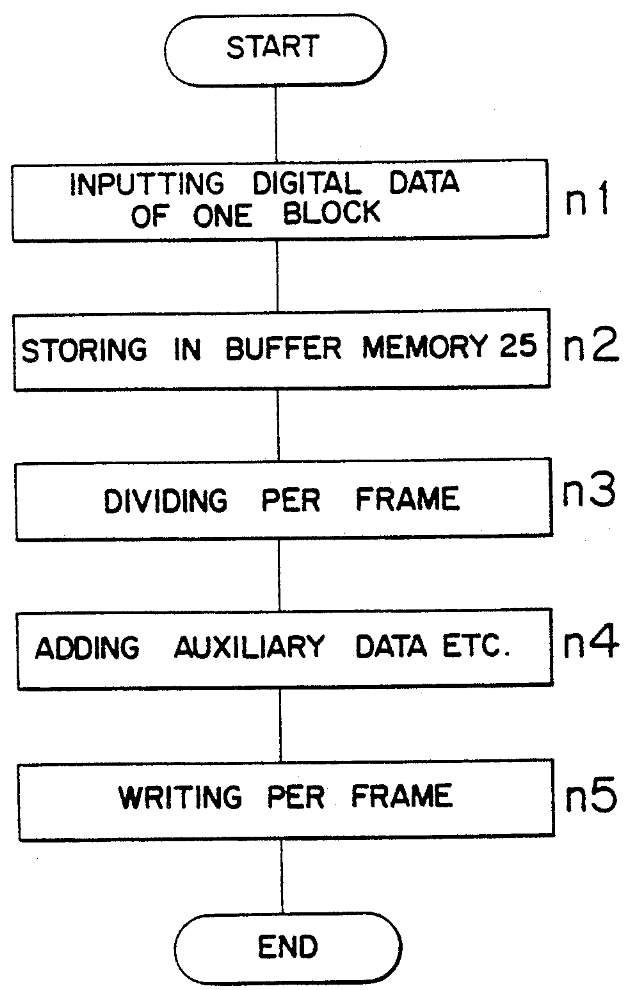
FIG. 6 is a flow chart to explain the recording operation of the recording/reproducing apparatus 24.

FIG. 6 is a flow chart to explain the recording operation of the recording/reproducing apparatus 24. With reference to FIG. 6, in the step nl, the digital data of one block is outputted from the external equipment 23 and is inputted into the recording/reproducing apparatus 24. In the step n2, the recording/reproducing apparatus 24 stores the digital data of the block in the buffer memory 25.

Thereafter, in the step n3, the digital data in the buffer memory 25 is divided into frames. In the step n4, such auxiliary data as the above mentioned block number and frame number is determined, and the frame number is sequentially added up per frame, counting from 0 (zero) by frames.

In the step n5, the recording signals on the basis of such digital data are fed to the magnetic heads 2a and 2b and are written on the magnetic tape 1. As such an operation is repeated several times, the digital data of a plurality of blocks is written onto the magnetic tape 1 frame by frame as shown in FIG. 5.

Figure 7:
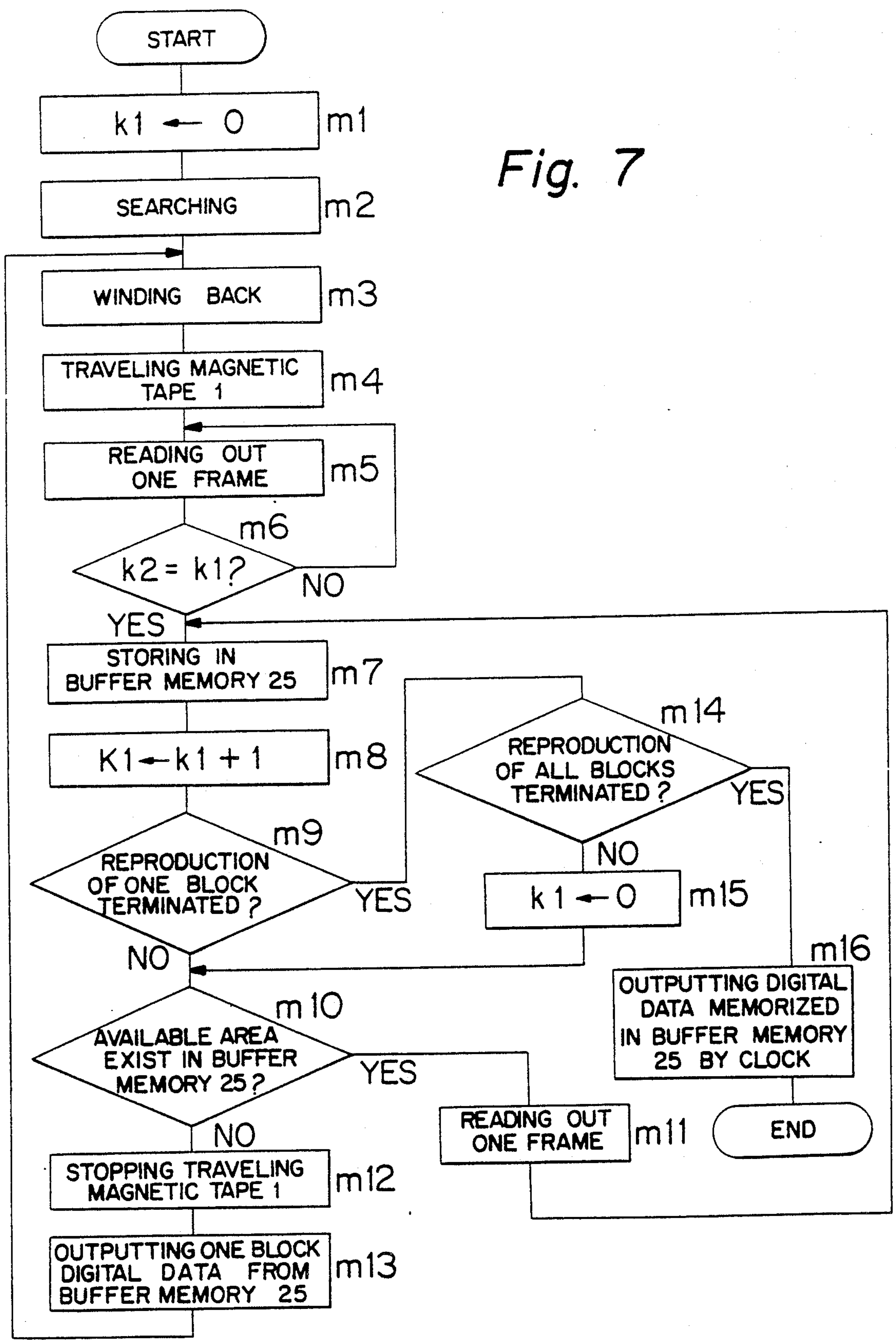
FIG. 7 is a flow chart to explain the reproducing operation of the recording/reproducing apparatus 24.

The magnetic tape 1 on which digital data is recorded is read out by the reproducing operation shown in the flow chart of FIG. 7. With reference to FIG. 7, in the step m1, the frame number k1 stored in the controller 31 is initialized to be set to [0]. In the step m2, data is searched for, in accordance with the block number of a reproduction starting block of the digital data to be read out according to the signals received, for example, from the external equipment 23. This searching is carried out at the above mentioned high searching speed. After the required block number is detected, the processing goes to the step m3. Here, it is supposed that the frame number k2 which is incremented by one per frame, counting, for example, from $k2=0$ by the frames has been recorded in respective frames in which the digital data is recorded by the unit of block on the magnetic tape 1.

In the step m3, the magnetic tape 1 is wound back up to the position where the first frame in a block of the block number can be read out without fail. Thereafter, in the step m4, the magnetic tape 1 travels at the traveling speed Vt. As the traveling speed of the magnetic tape 1 is stabilized, the digital data of one frame is read out by the magnetic heads 2a and 2b from the magnetic tape 1 in the step m5.

In the step m6, the frame number k2 of the read-out frame is compared with the frame number k1 stored in the controller 31 of the frame to be read out. When $k2=k1$ is not established, the processing returns to the step m5 and subsequently the next frame is read out. If the relation $k2=k1$ is established, the processing goes to the step m7 and the main data of the read-out frame is stored in the buffer memory 25.

In the step m8, the frame number k1 stored in the controller 31 is renewed to the frame number $(k1+1)$ of a frame to be read out next.

In the step m9, it is judged whether or not the reproduction of the digital data of one block has been successfully completed. When the reproduction of the digital data of one block is not terminated, it is checked up whether or not available area equal to digital data of at least one frame exists in the buffer memory 25. When the answer is YES, the processing goes to the step m11, the digital data of the next frame is subsequently read out. Then, the processing returns to the step m7, and the above mentioned processing is repeated as well.

At the step m10, when there is no available area in the buffer memory 25, the controller 31 causes the magnetic tape 1 to stop, at the step m12. In the subsequent step m13, the digital data of one block which has been stored before the block now being reproduction and is to be outputted next is outputted from the buffer memory 25 to the external equipment 23. Thereafter, the processing returns to the step m3, and the above mentioned operation is repeated for the frame number kl of a frame to be read out next.

In the step m9, when the digital data of one block has been successfully reproduced, the processing goes to the step m14 wherein it is judged whether or not the digital data of all the blocks has been reproduced when reproducing the digital data of one or a plurality of blocks. Namely, when the digital data of all the blocks have not read out yet, the processing goes to the step m15, and the value of the frame number k1 stored by the controller 31 is initialized to be set to [0]. Then, the processing goes to the step m10. The above mentioned reproducing operation is carried out for a block of digital data corresponding to the block number to be read out next.

When reproduction of the digital data of all the blocks is terminated in the step m14, the processing goes to the step m16 wherein the digital data stored in the buffer memory 25 is outputted block by block to the external equipment 23. Then, the reproducing operation is terminated.

Thus, when the digital data is stored full in the capacity of the buffer memory 25 in this embodiment, for instance, when the capacity of the buffer memory 25 becomes full by storing the frame Fk in FIG. 5, the digital data of the block number j or one block stored in the buffer memory 25 therebefore is outputted to the external equipment 23 from the buffer memory 25, thereby causing available area in which new data can be stored, to be provided in the buffer memory 25.

At this time, though the traveling of the magnetic tape 1 stops, the controller 31 stores the frame number k1 (=k−1) of a frame to be read out next, and the frame number k2 corresponding to the frame is recorded in the auxiliary data area of respective frames of the magnetic tape 1. Therefore, by comparing the frame number k2 in the read-out frame with the frame number k1 stored in the controller 31, it is possible to read out the digital data from the frame Fk+1 of the required frame number k−1, that is, from the frame Fk+1 which becomes k2=k1 (=k−1), and to store the digital data sequentially in the buffer memory 25.

Therefore,any digital data in any frame it not skipped and the same digital data is not overlapped, it is possible to reproduce the digital data in a much higher reliability.

In this embodiment of the present invention, the processes from the discontinuance of the reproducing operation to the restarting operation of reproduction on the basis of detecting that any available area runs out in the buffer memory 25 are explained. However, this present invention can be effected as a matter of course in the cases that the reproducing operation must be discontinued due to any other cause.

In this embodiment of the present invention, it is explained that the recording/reproducing apparatus 24 of the digital tape recorder is used as auxiliary memory unit of the external equipment 23. However, this present invention is applicable for the recording/reproducing apparatus of other recording media such as an optical disc in which the information is recorded by predetermined recording unit.

In addition, the present invention is applicable for recording media such as a CD (compact disc) in which the digital data per recording unit is recorded together with identification information.

The present invention may be embodied in other specific forms without departing from the spirit or essential characteristics thereof. The present embodiments are therefore to be considered in all respects as illustrative and not restrictive, the scope of the present invention being indicated by the appended claims rather than by the foregoing description and all changes which come within the meaning and the range of equivalency of the claims are therefore intended to be embraced therein.

What is claimed is:

1. An apparatus for recording and reproducing using a recording medium comprising:

a recording medium having recording areas in which digital data is recorded in predetermined recording units;

generating means for generating digital data divided into at least one information unit having a variable amount of data associated therewith;

means for separating digital data of a same information unit when an amount of data in an information unit exceeds a capacity of a recording unit and for recording the digital data in the recording medium with discrimination information on a recording unit basis;

reproducing means for reproducing digital data from the recording medium on a recording unit basis;

memory means for storing the reproduced digital data and having a capacity exceeding a capacity of one information unit; and control means for storing discrimination information of the recording unit to be reproduced next when a reproducing operation is discontinued in response to an output from said reproducing means, for controlling said reproducing means to re-start at the recording unit to be reproduced next in accordance with the stored discrimination information, and for controlling said memory means to output the digital data stored therein to said generating means on an information unit basis.

2. The apparatus for recording and reproducing using a recording medium as claimed in claim 1, wherein said recording medium is a magnetic tape, the digital data is recorded by a helical scanning system, and the recording unit is one or a plurality of tracks inclined in a lengthwise dirction of said magnetic tape.

3. The apparatus for recording and reproducing using a recording medium as claimed in the claim 2 further comprising:

driving means for driving said magnetic tape;

first means for detecting that the stored digital data has reached a predetermined memory capacity of said memory means; and second means for detecting that a storage area equal to at least one recording unit is available in said memory means;

said control means controlling said driving means to stop in response to an output from said first means and controlling the reproducing operation to be re-started after said magnetic tape is wound back a predetermined distance by said driving means in response to an output from said second means after the reproducing operation is discontinued.

4. The apparatus for recording and reproducing using a recording medium as claimed in claim 1, wherein the discrimination information is distinct from the digital data to be recorded and is recorded repeatively in each recording unit.

5. A reproducing method for use with a recording medium in which data in form of a plurality of information units is recorded in predetermined recording units with identification information to specify the information unit corresponding to the recording unit comprising the steps of:

(a) storing data reproduced from the recording medium, recording unit by the recording unit, sequentially in a memory unit having a recording capacity more than one information unit;

(b) storing the identification information of the recording unit to be reproduced next when a reproducing operation is discontinued;

(c) restarting the reproducing operation at the recording unit to be reproduced next on the basis of the stored identification information and storing the reproduced data in the memory unit; and (d) outputting the data stored in the memory unit on an information unit basis after data of at least one information unit has been stored in the memory unit.

6. A method for recording digital data in a predetermined recording unit format on a recording medium and for reproducing digital data from the recording medium comprising the steps of:

(a) receiving digital data of an information unit basis from an external device, the information unit having avariable amount of data associated therewith;

(b) separating digital data according to information units and recording the digital data according to the predetermined recording unit format on the recording medium with discrimination information when the amount of data in an information unit exceeds a capacity of a recording unit;

(c) storing the digital data reproduced from the recording medium sequentially, recording unit by recording unit, in a memory unit having a memory capacity more than one information unit when reproducing;

(d) storing discrimination information which indicates the recording unit to be reproduced next when a reproducing operation is discontinued;

(e) searching for the digital data of the recordin gunit to be reproduced next on the basis of the stored discrimination information, reproducing the searched digital data and storing the reproduced digital data in the memory unit; and (f) inputting the stored digital data to the external device on an information unit basis when digital data of at least one information unit is stored in the memory unit.

7. An apparatus for reproducing data from a recording medium comprising:

a recording medium in which data forming one or more information units is recorded, the information unit being recorded on a recording unit basis, each recording unit being recorded with an identification information to specify the information unit associated therewith;

reproducing means for reproducing the data on a recording unit basis from the recording medium;

memory means, having a memory capacity exceeding a capacity of one information unit, for storing data reproduced from the reproducing means; and control means for storing identification information of the recording unit to be reproduced next when said reproducing means is stopped, for controlling said reproducing means to re-start the reproducing operation at the recording unit to be reproduced next on the basis of the stored identification information, and for controlling said memory means to transfer data on an information unit basis to an external device when data of at least one information unit has been stored in said memory means.

* * * * *